April 16, 1946.    R. C. TURTLE ET AL    2,398,568
MECHANISM FOR TRANSMITTING ROTARY MOTION
Filed Feb. 15, 1944    3 Sheets-Sheet 1
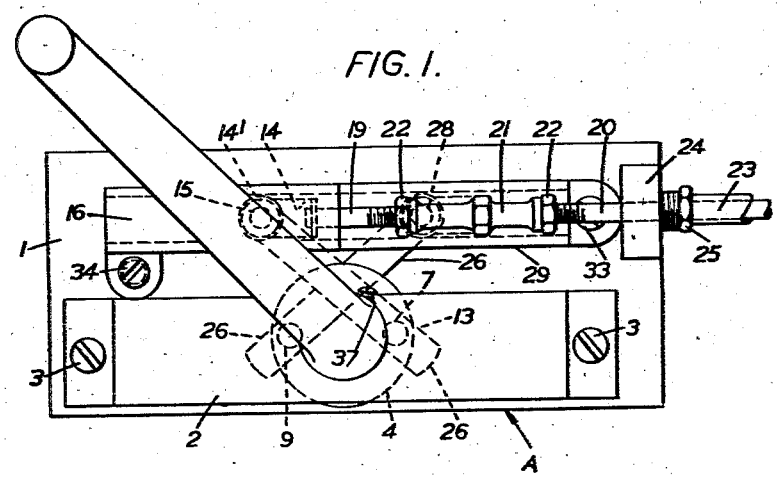
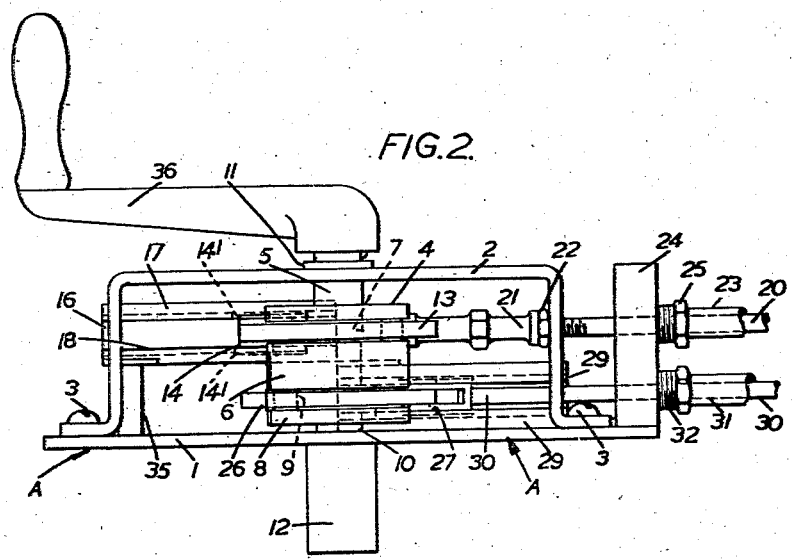
Inventors
R.C. TURTLE
By D.W. REYNOLDS
Attorneys

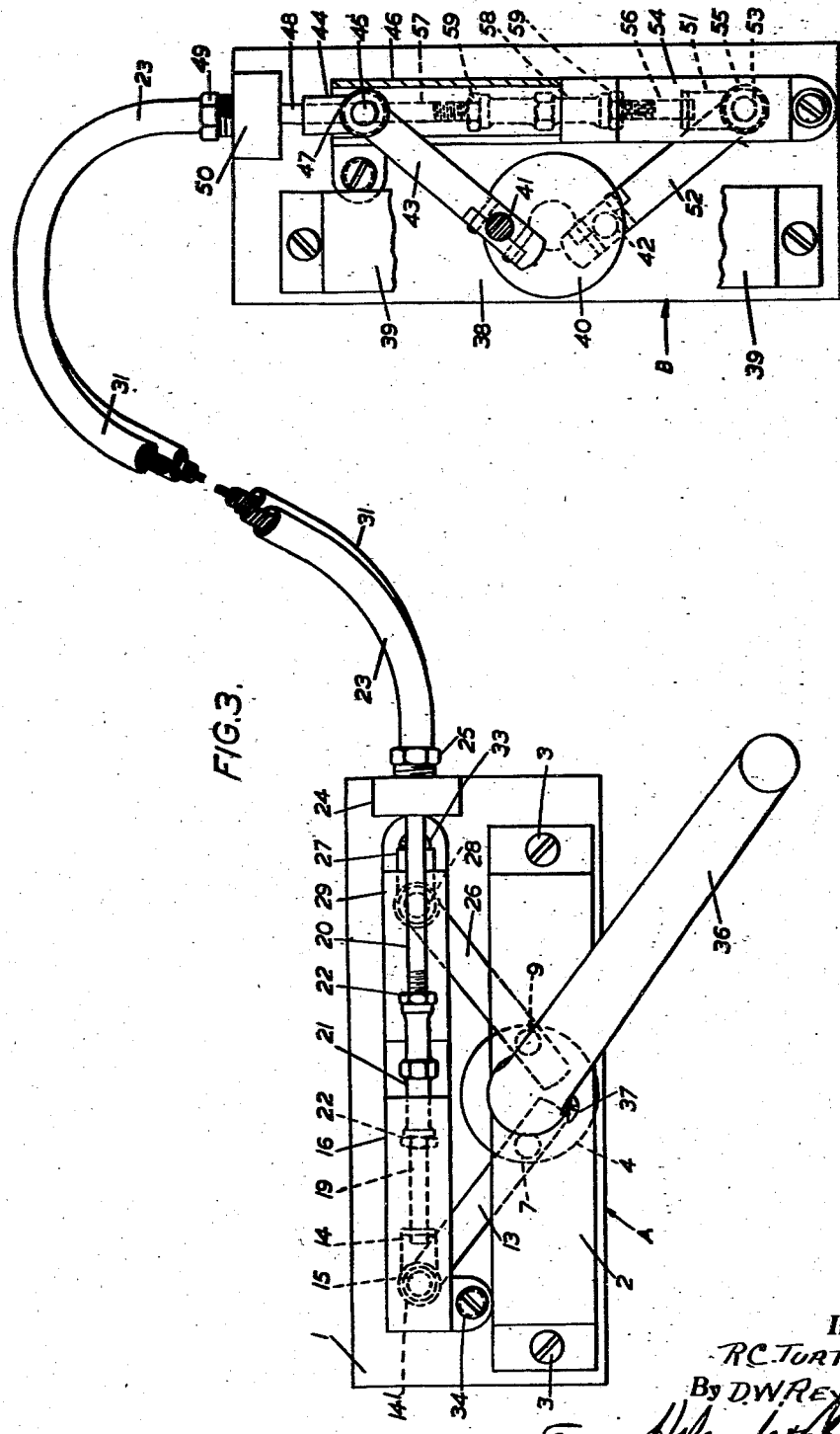

April 16, 1946.  R. C. TURTLE ET AL  2,398,568
MECHANISM FOR TRANSMITTING ROTARY MOTION
Filed Feb. 15, 1944   3 Sheets-Sheet 3
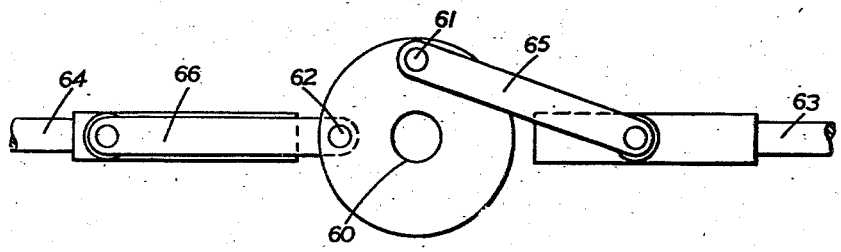
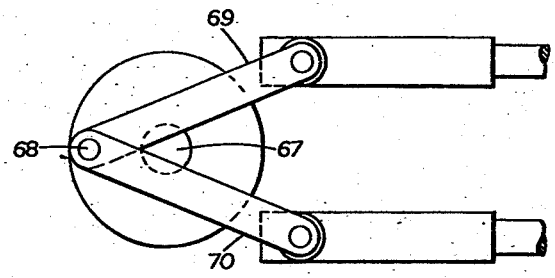
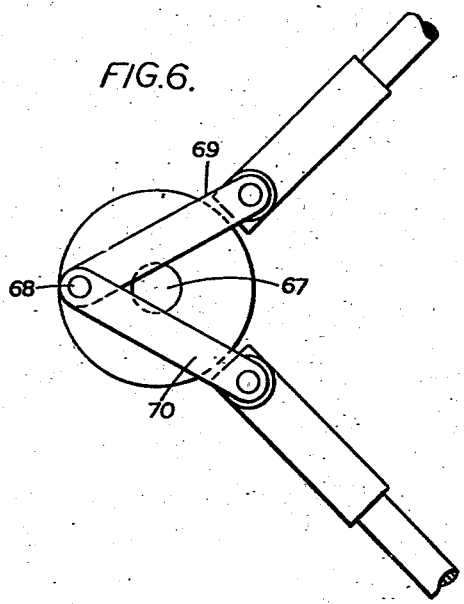
Inventors
R.C. TURTLE.
By D.W REYNOLDS
Attorney Patented Apr. 16, 1946

2,398,568

UNITED STATES PATENT OFFICE 2,398,568

MECHANISM FOR TRANSMITTING ROTARY MOTION

Rupert Clifford Turtle, Shirley, Croydon, and David William Reynolds, Hackbridge, England, assignors to Arens Controls Limited, East Croydon, England, a company of Great Britain Application February 15, 1944, Serial No. 522,462 In Great Britain May 21, 1942

14 Claims. (Cl. 74—501)

This invention relates to improvements in or relating to mechanism for transmitting rotary motion and has for one of its objects to provide simple and efficient mechanism with the aid of which rotary motion through any desired angle or any desired number of revolutions may be imparted to a driven member even though such driven member may be located in a relatively inaccessible position and the use of rotary shafting is therefore impossible or impracticable.

Another object is to provide mechanism wherein rotary motion is converted into reciprocatory motion, in a driving unit and transmitted by means of cables to a driven unit wherein the said reciprocatory motion is converted into rotary motion.

Yet another object is to provide mechanism wherein rotary motion is converted into reciprocatory motion in a driving unit and said reciprocatory motion is transmitted by means of cables to a driven unit, the driven unit including means for converting said reciprocatory motion into rotary motion and the assembly being such that when the drive transmission to one cable is in a condition of dead centre the drive transmission to the other cable is in a condition for imparting movement to the output member of driven unit so ensuring that drive can be imparted to said member with the operating member of said driving unit in any position.

A still further object is to provide mechanism wherein rotation of a driving shaft of a driving unit imparts rotary movement to a driven shaft of a driven unit through the medium of means including at least two reciprocatory cables. With the above and other objects hereinafter set forth in view the present invention resides in the construction and arrangement of parts hereinafter described and claimed in the appended claims.

According to a broad aspect of the present invention there is provided rotary control mechanism comprising a driving unit incorporating a driving shaft having one or more cranks, a driven unit incorporating a driven shaft having one or more cranks, drive transmitting means comprising at least two flexible cables guided and supported in relatively rigid casings, and coupling means connecting the said cables to the crank or cranks on the driving shaft and to the crank or cranks on the driven shaft, the disposition of the parts being such that when the drive connection associated with one of the cables is in a condition of dead centre the drive connection with the other or another of the said cables is in a condition for transmitting movement from the driving shaft to the driven one thus enabling the latter to be rotated through any desired angle or any desired number of revolutions in either direction pursuant to rotation of said driving shaft.

The aforesaid flexible cable or the like preferably comprises an inner core consisting for example of multi-stranded wire adapted for the transmission of tension and an outer part consisting for example of a coiled wire casing adapted for the transmission of compression so that said flexible cable or the like is capable of transmitting relatively big forces in two opposite directions.

The aforesaid relatively rigid casing for the flexible cable may be formed from a casing of helically wound wire or strip material of suitable rigidity or it may be formed by conduits formed in a body, for instance a wall, through or adjacent to which it is desired that the controlling means should run. In many cases, however we prefer to employ a length of tubing as the casing, such tubing preferably being of such characteristics that it can be bent and so follow a tortuous path should this be necessary.

It will be understood that the positions of the ends of the cables which are caused to reciprocate during operation of the transmission mechanism will vary with the number of cranks provided on the driving and driven shaft and with the relative disposition of the cranks in cases where more than one crank is provided on each of said shafts. Thus for example in cases where each of the said shafts includes two cranks and the latter are disposed at 180° with respect to one another the respective ends of the cables may be caused to reciprocate in a line which is out of alignment with the axis of the crank shaft concerned e. g. tangentially to a circle struck about the axis of the said crank shaft. If on the other hand the said shafts include two cranks disposed at another angle, e. g. 90°, the ends of the associated cables may be caused to reciprocate in a line which lies in the same plane as the axis of the crank shaft. If the crank shaft includes only a single crank then the ends of the cables may be constrained for reciprocation in lines which are disposed tangentially with respect to and on opposite sides of a circle struck about the axis of the crank shaft concerned or such lines of reciprocation may be disposed at an angle with respect to one another and in a plane which is at right angles to the axis of the crank shaft.

It will of course be understood that by the term "crank" as used herein we intend to include an eccentric or like equivalent and that the aforesaid plurality of cranks may be formed by a multi-throw or built-up crank shaft.

In order that the present invention may be well understood we will now describe, by way of example only one embodiment thereof with reference to the accompanying drawings in which:

Figure 1 is a plan view of one form of driving unit,

Figure 2 is a side elevation of the unit shown in Figure 1,

Figure 3 is a partly broken and partly sectional plan view showing the complete device, the driven unit being shown with parts broken away and the driving unit agreeing exactly with that shown in Figures 1 and 2 subject to the control handle being turned into a position diametrically opposed to that shown in the earlier figures, and Figures 4, 5 and 6 show three modified dispositions of the cranks and coupling means.

Referring to the figures the driving unit is generally designated A and the driven unit B, such units being as nearly identical as is possible consistent with their respective functions so that they can be built up from the smallest possible number of different parts.

The driving unit A includes a base plate 1 on which is mounted a bracket 2 forming a frame for the hereinafter described crank mechanism, said bracket being secured in position by means of screws 3 or in any other convenient manner.

The crank mechanism comprises a two-throw built-up crank shaft consisting of a crank disc 4 secured to a driving shaft 5, a disc 6 secured to the crank disc 4 by a crank pin 7 and a crank disc 8 secured to the disc 6 by a crank pin 9, the crank disc 8 being secured to a shaft 10 and the pins 7 and 8 being diametrically opposed with respect to one another.

A bearing bush 11 is fitted to the bracket 2 for supporting the aforesaid shaft 5 and a bearing bush or cap 12 is fitted to the base plate 2 for supporting the aforesaid shaft 10.

A link 13 is pivoted at one end to the aforesaid crank pin 7 and the opposite end is pivotally connected to a slipper 14 by means of a pin 15, the said link being provided with a split bearing for engaging the said crank pin 7.

The aforesaid slipper 14 is longitudinally slidable in a casing or guideway 16, said guideway being of rectangular cross-section with an opening extending along its inner face between the opposed flanges 17 and 18.

In order to reduce to a minimum the frictional opposition to movement of the aforesaid slipper 14 rollers 14' are preferably mounted on the ends of the pin 15, said rollers closely fitting the guideway 16 and the slipper 14 being slightly smaller so that it does not make rubbing contact therewith.

A screw-threaded rod 19 is secured to the aforesaid slipper 14 and is adjustably coupled to a rod 20 by means of an adjusting sleeve 21, the said sleeve being internally threaded with right and left hand portions for engagement with corresponding threads on the said rods 19 and 20 thus providing for adjusting the distance of separation between the said rods. Lock nuts 22 or other suitable means are preferably provided for locking the aforesaid sleeve in its adjusted position.

The abovementioned rod 20 constitutes one end member of a flexible transmission element slidably housed in a tubular casing 23, the said element preferably being adapted for transmitting tension and thrust and consisting for example of a stranded cable or the like surrounded by a coiled wire sheath, the said cable being adapted for transmitting tension and the said sheath being adapted for transmitting compression.

The aforesaid casing 23 may consist of a tube of brass or other suitable metal and it may extend in any desired direction and include bends of any desired contour dependent upon the course which it is desired the transmitting means should follow, although the part in which the rod 20 reciprocates is of course straight.

The end of the casing 23 adjacent to the driving unit A is supported in a block 24 mounted on the base plate 2, a screwed bushing 25 being provided for locking the said casing in position.

One end of a link 26 is pivotally mounted on the aforesaid crank pin 9 and the opposite end is pivotally connected to a second slipper 27 by means of a pin 28. The said second slipper is slidable in a guideway 29, which is in form similar to the above mentioned guideway 16, said slipper being rigidly connected to a rod 30.

The rod 30 constitutes the end member of a flexible transmission device housed in a tubular casing 31, the said transmission device and casing being for instance similar to those above described and the said casing 31 being secured to the above mentioned block 24 by means of a bushing 32 in a manner similar to that adopted for securing the casing 23.

The aforesaid guides 16 and 29 are preferably formed integrally and the unit may then be secured to the base plate 2 by means of a screw 33 at the end which is in contact with the said base plate and a screw 34 passing through a distance piece 35 at the opposite end i. e. the end which is spaced away from the base plate.

The above mentioned shaft 5 is provided with any suitable driving means, e. g. a crank handle 36, such handle being for instance secured to the said shaft by means of a set screw 37.

The driven unit B includes a base plate 38, a bracket 39 and a two-throw built-up crank shaft mounted in the so-formed frame. Such base plate, bracket and crank-shaft are identical with those described with reference to the driving unit A and complete illustration and detailed description of the various parts is accordingly unnecessary. The disc 40 shown in Figure 3 is the equivalent of the disc 6 of the driving unit and the crank pins 41 and 42 are the equivalents of the crank pins 7 and 9 respectively.

A link 43 is pivotally connected at one end to the aforesaid crank pin 41 and at the other end it is pivotally connected to a slipper 44 by means of a pin 45, the said slipper being slidable in a guideway 46 similar to the guideway 16 of the driving unit A.

Rollers, one of which is designated 47 in Figure 3, are preferably fitted to the ends of the pin 45 so as to promote free reciprocation of the slipper in the guideway 46.

The aforesaid slipper 44 is rigidly connected to a rod 48 constituting the second end member of the transmission device extending through the casing 23, the adjacent end of the said casing being secured by means of a bushing 49 to a block 50 mounted on the base plate 38.

The crank pin 42 of the driven device B is coupled to a slipper 51 by means of a link 52, a pin 53 providing pivotal connection between the said link and slipper. The slipper is slidable in a casing or guideway 54 and as in the case of the earlier described slippers rollers, one of which is designated 55, are fitted to the ends of the pin 53 in order to reduce any frictional opposition to movement of the slipper in the said guideway.

A rod 56 is rigidly connected to the slipper 51 and is coupled to a rod 57 by means of an adjustable sleeve 58 making engagement with the two rods by right and left hand threads respectively, lock nuts 59 or other suitable means being provided for locking the said sleeve in any desired position of adjustment.

The abovementioned rod 57 constitutes the second end member of the flexible transmission device housed in the casing 31, said end member being complementary to the end member 30 of the driving unit A. The adjacent end of the said casing 31 is secured to the block 50 in a position immediately under the point where the casing 23 is secured and the securing means may include a bushing similar to the bushing 49.

One or both of the shafts of the crank unit of the driven device B, i. e. the parts equivalent to the parts 5 and 10 of the driving device A, may be suitably extended for carrying or making engagement with a device to be operated. Thus for instance the said shaft may carry a gear wheel adapted to engage a gear wheel carried on the spindle of a screw down steam valve, the teeth on one of the wheels being sufficiently wide to accommodate the sliding movement which results from rotation of the valve spindle.

The aforesaid adjusting devices 21 and 58 enable the flexible couplings housed in the casings 23 and 31 to be tensioned so avoiding any backlash and ensuring that any movement of the shaft of the driving unit will be immediately imparted to the shaft of the driven unit. If desired adjusting means may be incorporated in the driving unit and in the driven one for adjusting both flexible couplings but it is usually adequate to provide for adjustment at one end only of each coupling and by adopting the arrangement shown in the drawings, i. e. by providing adjustment for one coupling on the driving unit and the adjustment for the other one on the driven unit and associating the adjustment in both cases with the rearwardly extending link, i. e. the links 12 and 52 respectively, the overall lengths of the two units can be reduced to a minimum.

It will of course be understood that the aforesaid base plates 1 and 38 may be provided with side walls, end walls and a cover plate so forming box-like enclosures for all the moving parts with the exception of the projecting end or ends of the driving and driven shafts.

The above-described driving unit may be located on a control panel situated at any desired distance from the valve or other device to be controlled and the driven unit may be mounted adjacent to said valve or other device in any convenient way. Thus, for instance, said unit may have suitably shaped brackets or the like for seating on the steam-pipe and U-shaped anchor bolts adapted to be passed around said pipe may be employed for securing the unit in position.

The two flexible transmission elements extending between the above-described driving and driven units may be of similar lengths and be disposed in parallel positions with respect to one another. It is not imperative however for such an arrangement to be adopted as the two couplings may take entirely different paths and in such cases they may be of different lengths.

Whilst we have hereinbefore described one embodiment of the present invention we wish it to be understood that the specific details may be varied or modified without departing from the scope of such invention. Thus, for instance, the actuating member of the driving unit may be disposed for rotation in any desired plane. It is also to be understood that controlling mechanism according to the present invention may be used for controlling many devices other than steam valves and indeed it may be used with advantage for the remote control of any mechanism located in a position which is relatively inaccessible or where the use of rotary shafting is impracticable or undesirable.

It is also to be understood that it is not essential for the crank shaft of the driving unit and the crank shaft of the driven unit to incorporate two diametrically opposed cranks. Thus said shafts may for instance incorporate two cranks disposed at 90° with respect to one another for example in the manner shown diagrammatically in Figure 4 where reference numeral 60 designates the shaft of the unit concerned and this has two cranks 61 and 62 disposed at 90° with respect to one another and connected to cables 63 and 64 by means of links 65 and 66 in a manner similar to that described with reference to the earlier figures, the line of reciprocation of the cable ends being coplanar with the axis of the shaft. It is also within the scope of the present invention to employ in the driving and driven units shafts having single cranks as shown diagrammatically for instance in Figures 5 and 6. In Figure 5 the shaft 67 has a single crank 68 and this is connected to the associated two cables by links 69 and 70 and slippers as described with reference to the earlier figures. The outer ends of the links 69 and 70 accordingly reciprocate in lines which are tangential to a circle struck about the axis of the shaft 67 and said lines are parallel to one another and on opposite sides of said axis. Said lines of reciprocation need not necessarily be parallel to one another however and they may for instance be disposed at an angle as shown in Figure 6 where the parts are otherwise identical with those shown in Figure 5 and are accordingly designated by similar references and do not require further description.

We claim:

1. Rotary control mechanism comprising a driving unit incorporating a rotatable driving shaft, a driven unit incorporating a rotatable driven shaft, crank mechanism associated with said two shafts, drive transmitting means comprising at least two flexible cables guided and supported in casings for transmitting driving force in two directions, coupling means interconnecting the cable and the crank mechanism associated with the driving shaft and the crank mechanism associated with the driven shaft for transmitting driving force in two directions, the said crank mechanism being so arranged that conditions of dead center in the drives through the respective cables being attained at different times and providing for the transmission of continuous rotary motion.

2. Rotary control mechanism as claimed in claim 1 wherein each of the said flexible cables is of a composite nature and comprises a flexible inner core adapted for transmitting tension and a flexible sheath consisting of helically coiled wire adapted for transmitting compression.

3. Rotary control mechanism as claimed in claim 1 wherein the said coupling means comprise slippers constrained for linear reciprocation and links connecting said slippers to said cranks.

4. Rotary control mechanism comprising a driving unit incorporating a driving shaft, two cranks associated with said driving shaft, a driven unit incorporating a driven shaft, two cranks associated with said driven shaft, a flexible cable extending between one of the cranks of the driving shaft and one of the cranks of the driven shaft and connected thereto by coupling means, a flexible cable extending between the other of said cranks of the driving shaft and the other of the cranks of the driven shaft and connected thereto by coupling means, and guides and supports for said flexible cables arranged to enable said cables to transmit power in both of their directions of movement, the drives through the respective cables attaining conditions of dead center at different times.

5. Rotary control mechanism comprising a driving unit incorporating a driving shaft, two cranks associated with said driving shaft in diametrically opposed positions, a driven unit incorporating a driven shaft, two cranks associated with said driven shaft in diametrically opposed positions, and coupling means comprising a flexible cable extending between one of the cranks on the driving shaft and one of the cranks on the driven shaft and a flexible cable extending between the other of the cranks on the driving shaft and the other of the cranks on the driven shaft and guides and supports for said flexible cables arranged to enable said cables to transmit power in both of their directions of movement, the drive through the respective cables attaining conditions of dead center at different times.

6. Rotary control mechanism as claimed in claim 5 wherein slippers restrained for linear reciprocation are connected to the ends of said cables and said slippers are coupled to said cranks by means of links, said links being pivotally connected to said slippers and to said cranks.

7. Rotary control mechanism comprising a driving unit, a driven unit and coupling means therebetween wherein the driving unit includes a driving shaft having two cranks, the driven unit includes a driven shaft having two cranks and the coupling means comprise two flexible cables, means for connecting the ends of said cables to said cranks and means for guiding and supporting said cables, the said means for connecting the cables to the cranks being so disposed that conditions of dead center in the drives through the respective cables are attained at different times and comprising slippers connected to the cables, guides for constraining said slippers to linear reciprocation and links pivoted to said slippers and to said cranks and functioning as connecting rods.

8. Rotary control mechanism as claimed in claim 7 wherein the said two cranks on the driving shaft are disposed at 180° with respect to one another, the said two cranks on the driven shaft are also disposed at 180° with respect to one another and the said slippers are constrained to reciprocate in lines which are tangential to circles struck about the axes of the driving and driven shafts respectively.

9. Rotary control mechanism comprising a driving unit, a driven unit and drive transmitting means extending therebetween wherein the driving unit includes a rotatable crank shaft, the driven unit includes a rotatable crank shaft, and the drive transmitting means comprise flexible cables guided for reciprocation in supporting tubes and having their ends connected to the cranks of the driving and driven shafts, the disposition of the cranks and coupling means between said cranks and cables being such that the drive transmission through the individual cables attains a condition of dead centre at different times and rotation of the driven shaft is accordingly possible irrespective of the position of the driving and driven shafts and irrespective of the angle or number of turns through which it is desired to rotate the driven shaft, and the cable being supported to transmit power in both directions of movement.

10. Rotary control mechanism as claimed in claim 7 wherein the said two cranks on the driving shaft are disposed at 90° with respect to one another and the said two cranks on the driven shaft are also disposed at 90° with respect to one another.

11. Rotary control mechanism as claimed in claim 7 wherein the said two cranks on the driving shaft are disposed at 90° with respect to one another, the said two cranks on the driven shaft are also disposed at 90° with respect to one another and the said slippers are constrained to reciprocate in a plane containing the axis of the associated crank shaft.

12. Rotary control mechanism as claimed in claim 7 wherein the said two cranks on the driving shaft are disposed at 90° with respect to one another, the said two cranks on the driven shaft are also disposed at 90° with respect to one another and the said slippers are constrained to reciprocate in lines which are at an angle to one another but lie in a plane at right angles to the axis of the crank shaft concerned.

13. A rotary control mechanism comprising a driving unit; a driven unit; each of said units comprising a base, a relatively long guide casing mounted on the base, a shaft rotatably mounted on the base on an axis at an angle to the casing and at one side of said casing, guide means slidable in said casing, divergent links crank connected to said shaft and pivoted to said guide means, said casing having slots at the side adjacent said shaft through which the links angularly and operatively pass; and drive transmitting means comprising flexible cables attached to the guide means of said units.

14. A rotary control mechanism comprising a driving unit; a driven unit; each of said units comprising a base, a relatively long guide casing mounted on the base, a shaft rotatably mounted on the base on an axis at an angle to the casing and at one side of said casing, guide means slidable in said casing, said guide means comprising slippers, a device connecting the slippers for relative adjustment longitudinally with respect to each other, diverging links crank connected to said shaft and pivoted one to each adjacent slipper, said casing having slots at the side adjacent said shaft through which the links angularly and operatively pass; and drive transmitting means comprising flexible cables attached to the slippers of both units.

RUPERT CLIFFORD TURTLE.
DAVID WILLIAM REYNOLDS.